United States Patent [19]

Moskovich

[11] E Patent Number: Re. 31,882

[45] Reissued Date of Patent: May 14, 1985

[54] LIQUID DISPENSING NOZZLE ASSEMBLY AND METHOD OF USING SAME

[75] Inventor: Peter P. Moskovich, Gary, Ind.

[73] Assignee: Atlantic Richfield Company, Harvey, Ill.

[21] Appl. No.: 134,142

[22] Filed: Apr. 7, 1980

Related U.S. Patent Documents

Reissue of:

[64] Patent No.: 4,008,738
Issued: Feb. 22, 1977
Appl. No.: 536,533
Filed: Dec. 26, 1974

[51] Int. Cl.[3] ..... B65B 31/06

[52] U.S. Cl. ..... 141/5; 141/311 R; 141/392

[58] Field of Search ..... 141/1, 5, 39–44, 141/52, 59, 97, 290, 311 R, 382–388, 392; 277/89, 93, 935 D; 285/9 R, 226; 138/103

[56] References Cited

U.S. PATENT DOCUMENTS 1,881,106 10/1932 Vogt et al. ..... 141/392 X
3,840,055 10/1974 Wostl et al. ..... 141/392 X
3,899,009 8/1975 Taylor ..... 141/97 X
3,907,010 9/1975 Burtis et al. ..... 141/59 X
3,974,865 8/1976 Fenton et al. ..... 141/311 R

FOREIGN PATENT DOCUMENTS 641380 9/1927 France ..... 141/392

*Primary Examiner*—Stephen Marcus
*Attorney, Agent, or Firm*—Allegretti, Newitt, Witcoff & McAndrews, Ltd.

[57] ABSTRACT

An improved liquid dispensing nozzle assembly comprising a liquid-dispensing nozzle means; a flexible vapor collector means forming a chamber around the upper portion of the nozzle spout; a face means located adjacent to one end of the vapor collector for forming a seal with the outer surface of a liquid receiver inlet; and at least two spring members each of which act to extend the flexible vapor collector means, each of these spring members having one end attached to a different point of the face means so that the face means has substantially free rotational movement transverse to the axis of the nozzle spout.

An improved method for dispensing liquid has also been discovered.

42 Claims, 3 Drawing Figures

LIQUID DISPENSING NOZZLE ASSEMBLY AND METHOD OF USING SAME

Matter enclosed in heavy brackets [ ] appears in the original patent but forms no part of this reissue specification; matter printed in italics indicates the additions made by reissue.

The present invention relates to a nozzle for dispensing a liquid, and more particularly to a nozzle having means for preventing the escape of vapors during a liquid dispensing operation.

Hydrocarbon based fuel, e.g., gasoline, is normally dispensed through a fuel-dispensing nozzle to, for example, an automobile fuel tank. Often, during this fuel dispensing operation, hydrocarbon vapor escapes from the fuel tank fillpipe. This escaped hydrocarbon may add to the already pressing air pollution problem. Various governmental regulations have been proposed which would require that the escape of both liquid fuel and fuel vapor from vehicles which are being supplied with fuel be controlled and/or minimized.

The prior art has suggested various means of recovering vapors which otherwise would escape to the atmosphere while fuel tanks are being filled. For example, see U.S. Pat. Nos. 3,581,782; 3,566,928; 2,850,049 and 2,908,299. The first of these patents discloses a vapor emission control system suitable for gasoline and other liquid fuel delivery systems, and adapted to reduce the escape of fuel vapors to the atmosphere. The disclosed embodiment of the control system includes, for example, a flexible annular sleeve surrounding the spout or outlet means of the nozzle. During fueling operation, this sleeve is sealed to the fillpipe of the fuel tank by means of an expandible member which, when expanded after the spout is inserted into the fillpipe, reduces the emission of vapor to the atmosphere.

One problem which has occurred in attempting to minimize fuel vapor loss relates to the seal between the fuel-dispensing nozzle assembly and the fuel tank fillpipe. Various means, some of which are disclosed in the patents noted above, have been devised in order to promote an effective nozzle assembly-fillpipe seal. However, in spite of these developments, the problem of obtaining an effective seal persists.

Another problem with the nozzle assembly-fillpipe seal involves the manual strength required to maintain an effective seal. Often a gasoline service station attendant, after having filled many fuel tanks, will become tired and unable to provide enough force to maintain a proper or effective seal. In addition, many gasoline service stations are being converted to self-service wherein the gasoline consumer himself or herself dispenses fuel. Such consumers often do not have the required strength and/or skill to use the prior art nozzle assemblies and obtain an effective assembly-fillpipe seal. A still further problem involves the position of the fuel tank fillpipe. Automotive fuel tank fillpipes are situated in a great many different positions, some of which are easy and others relatively difficult, if not impossible, to reach with certain prior art vapor recovery nozzle assemblies. Therefore, it would be beneficial to provide an improved fuel-dispensing nozzle assembly which provides an easy and effective assembly-fillpipe seal. For example, it would be advantageous to provide an improved vapor recovering, liquid fuel-dispensing nozzle assembly which does not require constant external applied force, e.g., hand holding, to maintain an effective assembly-fillpipe seal with various fillpipes having significantly different positions.

It is therefore, a primary object of the present invention to provide an improved vapor recovering, liquid-dispensing nozzle assembly.

It is a further object of the present invention to provide a vapor recovering, liquid-dispensing nozzle assembly wherein the seal between the nozzle assembly and the liquid receiver inlet, e.g., automobile fuel tank fillpipe, is improved.

Another object of the present invention is to provide an improved vapor recovering, liquid-dispensing nozzle assembly which is capable of maintaining an effective assembly-liquid receiver inlet seal with receiver inlets having significantly different positions.

It is yet a further object of the present invention to provide an improved vapor recovering, liquid-dispensing nozzle assembly which is simple in design and easy to operate.

An additional object of the present invention is to provide an improved method for dispensing liquids, e.g., liquid fuels. Other objects and advantages will become apparent hereinafter.

The present invention involves a liquid-dispensing nozzle assembly for delivery of liquid from a liquid source to a liquid receiver having a receiver inlet. The assembly is provided with means to minimize escape of vapor, e.g., from the liquid receiver, during delivery of liquid to the receiver inlet from the liquid source. The present liquid-dispensing nozzle assembly, which is useful in conjunction with a liquid receiver having a liquid receiver inlet, comprises:

a liquid-dispensing nozzle means having a nozzle inlet, a nozzle housing and an elongated nozzle outlet or discharge spout adapted for insertion into the liquid receiver inlet;

a flexible vapor collector means surrounding, in spaced relation thereto and forming a chamber therearound, the upper portion of the spout nearest the nozzle housing for receiving vapors from the liquid receiver, the chamber being in fluid communication with the receiver inlet when liquid is being delivered through the liquid receiver inlet, one end of the vapor collector being attached to the nozzle housing;

a face means located adjacent to the second end of the vapor collector away from the end attached to the housing for forming a seal with the outer surface of the liquid receiver inlet, the spout of the nozzle means extending beyond the second end of the vapor collector means when liquid is being delivered through the liquid receiver inlet; and at least two spring members, preferably located at least partially inside the outer surface of the vapor collector and more preferably located essentially totally inside the outer surface of the vapor collector, each of which acting to extend the flexible vapor collector means, each of these spring members having one end attached to a different point of the face means so that the face means has substantially free rotational movement transverse to the axis of the spout.

Outstanding results, e.g., improved liquid-dispensing nozzle assembly-liquid receiver inlet seal effectiveness and reduced vapor loss, are obtained using the present liquid-dispensing nozzle assembly.

*The present invention relates to an improvement in a liquid-dispensing nozzle assembly for delivery of liquid from a liquid source to a liquid receiver having a receiver*

*inlet, said assembly being provided with means to reduce escape of vapor during delivery of liquid to said receiver inlet from said source, which includes a liquid-dispensing nozzle having a nozzle inlet, a nozzle housing and an elongated discharge spout adapted for insertion into said receiver inlet; a vapor collector surrounding, in spaced relation thereto and forming a chamber therearound, the upper portion of said spout nearest said nozzle housing, said chamber being in fluid communication with said receiver inlet during said liquid delivery, one end of said vapor collector being attached to said nozzle housing or said upper portion of the spout; a face means located adjacent to the second end of said vapor collector for forming a surface seal against the outer surface of said receiver inlet, provided that said spout extends beyond said second end of said vapor collector during said liquid dispensing; and spring means interposed within said vapor collector and acting to extend said vapor collector, the improvement which comprises said spring means being attached to a plurality of different points on said face means, said spring means and said vapor collector cooperating with said face means to provide for substantially free rotational movement of said face means transverse to the axis of said spout prior to insertion of said spout into said receiver inlet.*

The substantially free rotational movement noted above refers to interplanal, rather than intraplanal, rotational motion. Of course, this type of rotational movement transverse of the axis of the spout is limited in that as the face means rotates, it eventually comes in contact with the spout itself. This substantially free rotational movement of the face means of the present apparatus provides for effective and efficient face means-liquid receiver inlet seals even though the positions of various receiver inlets differ significantly.

In a preferred embodiment, the present liquid-dispensing nozzle assembly further comprises at least one latch means located adjacent to the spout for automatically, i.e., without hand holding, maintaining the spout in the liquid receiver inlet after insertion. In an additional preferred embodiment, the face means of the present apparatus includes a compressible cellular plastic material, such as a foamed synthetic resin cellular plastic, which is carried by, attached or secured to the heel portion of the face means, e.g., that portion of the face means to which each of the spring members is attached, such that this material comes in contact with the liquid receiver inlet during liquid dispensing operations. The presence of such material acts to further improve the seal between the nozzle assembly and receiver inlet.

The apparatus of the present invention may be fabricated from any suitable material or materials of construction. The materials of construction used are dependent upon the particular application involved. In many instances, metals and metal alloys such as aluminum, iron, carbon steel or stainless steel, copper and the like may be used to construct the liquid dispensing nozzle of the present apparatus. Various organic polymers, e.g., polyethylene, polypropylene, polychloroprene, nylon, natural rubber and the like, may be used to construct the flexible vapor collector. Of course, the apparatus should be made of materials which are substantially unaffected by the liquid dispensed and the conditions, e.g., temperature, pressure and the like, at which the apparatus is normally operated. In addition, such materials should have no substantial detrimental effect on the liquid being dispensed.

These and other aspects and advantages of the present invention are set forth in the following detailed description and claims, particularly when considered in conjunction with the accompanying drawings in which like parts bearing like reference numerals are listed.

While the present invention is applicable to all liquid-dispensing nozzles, the present liquid-dispensing nozzle assembly is particularly useful with conventional liquid fuel nozzles, more particularly with hydrocarbon fuel, e.g., gasoline, nozzles. Therefore, the present invention will be described with reference to such liquid fuel dispensing nozzles, although those skilled in the art will realize that the invention generally is applicable to a much broader field.

The liquid fuel-dispensing nozzle of the present invention has a main body or housing having an integral handle, a fuel inlet, which normally comprises a flexible conduit means communicating between the source of fuel, such as an underground storage tank, and an elongated fuel outlet or discharge spout which is adapted for insertion into the liquid receiver inlet, e.g., fillpipe, of the fuel tank. At least one latch means is preferably provided, e.g., welded, screwed or bolted, around a major portion of the discharge spout. Such latch means assist in automatically maintaining the spout in the fillpipe during the liquid fuel dispensing operation. Such latch means are particularly useful in self-service, liquid fuel dispensing operations.

The present apparatus involves a flexible vapor collector means, such as a flexible bellows. One end of the bellows is attached, e.g., adhesively sealed and/or clamped or otherwise mechanically attached, to the housing at the upper end of the spout. The second end of the bellows is located adjacent to the face means and may be attached, e.g., adhesively sealed and/or clamped or otherwise mechanically attached, to the face means. As the spout is inserted into the liquid receiver inlet, e.g., fillpipe, the flexible vapor collector means tends to become compressed and the face means, preferably the compressible cellular plastic material portion of the face means, forms a seal with the outer surface of the fillpipe. The plurality of spring members attached at different points to the face means act to extend the flexible vapor collector means. In other words, each of these spring members pushes and holds the face means of the present apparatus in contact with the fuel tank fillpipe, thus providing an effective nozzle assembly-fillpipe seal.

Figure 1:
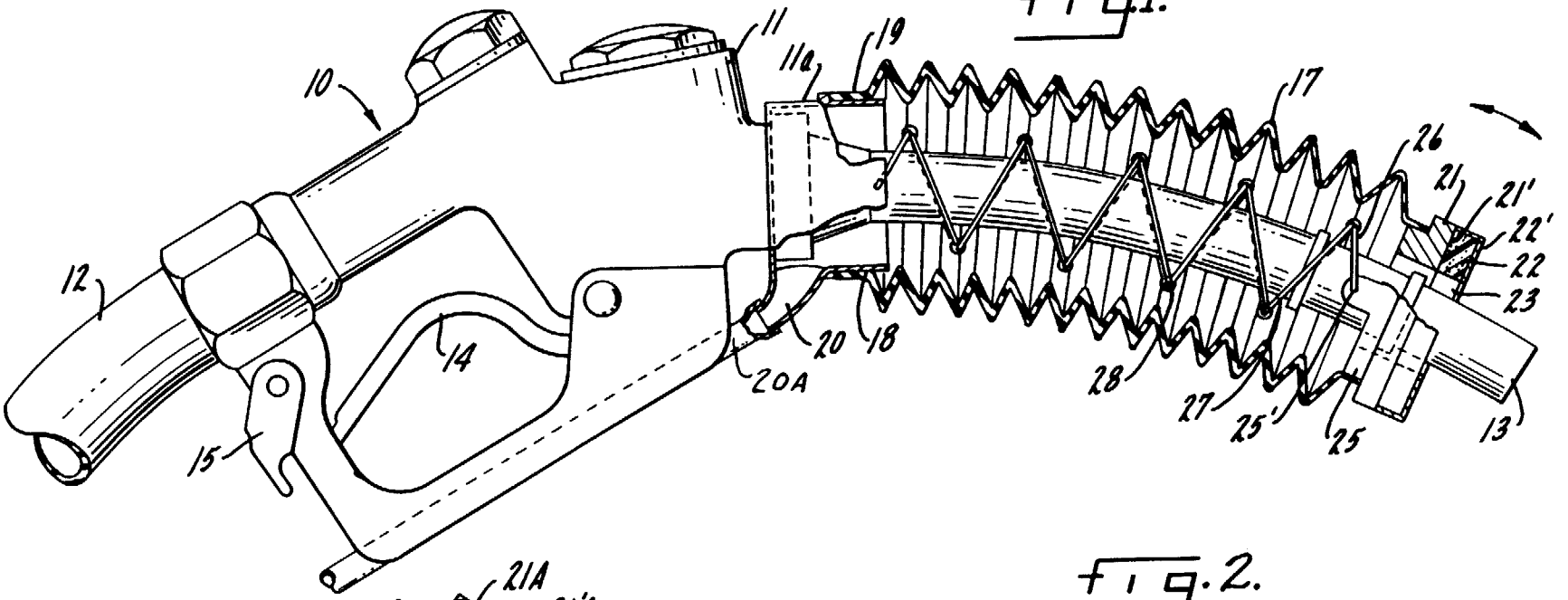
FIG. 1 is a side view, partly in section, of the improved liquid-dispensing nozzle assembly of the present invention.

Referring now to FIG. 1, a gasoline-dispensing nozzle is shown which is provided with vapor recovery means. More specifically, a nozzle, generally designated 10, comprises a main body or housing 11, an inlet conduit 12 and a discharge spout 13. A handle 14 is provided for actuating the delivery of gasoline or other liquid fuel. In addition, and as is conventional, a retainer means 15 is also provided on the main body of the housing 11 for holding the handle 14 in its fuel-delivery position. It is also conventional to provide such nozzles with means for automatically shutting off delivery of fuel when the fuel tank is full. Such means are not shown in FIG. 1, but may include, for example, an orifice near the termination of the spout 13, and a tube communicating from the orifice to a control mechanism within the housing 11 of the nozzle 10, wherein the control mechanism, sensing the presence of a gas or liquid near the orifice, acts to disengage handle 14 from retainer 15 thereby automatically stopping delivery of fuel through the nozzle 10.

Spout 13 is surrounded by flexible vapor collector means which may take the form of a flexible bellows 17. The upper end 19 of bellows 17 is adhesively sealed to surface 18 of collar member 11a of the nozzle 10. The opposite or second end of bellows 17 is adhesively sealed to annular extension 25 of heel portion 21 which has a substantially flat face 21'. Compressible cellular plastic material 22 is adhesively bonded onto flat face 21' of heel portion 21. Compressible cellular plastic material 22 includes protective coating 22' which is adhesively bound to material 22 and acts to reduce the wear and tear on, and thus lengthens the service life of, material 22. Heel portion 21 and compressible cellular plastic material 22 are both substantially annular in shape providing a space 23 between material 22, heel portion 21 and the outside surface of spout 13 and, thus, allowing vapors escaping from the fillpipe to pass between heel portion 21 and spout 13 and into the interior of bellows 17. An aperture 20 is conveniently provided near the upper end of the bellows 17 for removal of vapors. The means for removing the vapors from aperture 20 may comprise, for example, a conduit 20A attached to aperture 20, the conduit 20A providing fluid communication with, for example, a combustion means whereby the vapors may be rendered harmless or a vapor storage tank where the vapors may be stored to await further processing. In addition, the hydrocarbons in the vapors may be recovered by other suitable means such as by adsorption or condensation.

Heel portion 21 includes an annular extension 25 which extends from heel portion 21 toward bellows 17. Extension 25 includes, for example, two substantially opposing apertures 25' therethrough. Each of these apertures 25' in extension 25 is used to secure one end of spring members 26 and 27 to heel portion 21 so as to provide heel portion 21 with substantially free rotational movement transverse to the axis of spout 13. The other end of each spring member 26 and 27 is attached, e.g., welded, adhesively bound and/or otherwise mechanically attached, to collar member 11a of nozzle 10. Each of spring members 26 and 27 acts to extend bellows 17. Thus, with reference now to FIGS. 1 and 3, as spout 13 is inserted to fillpipe 35 and bellows 17 tends to compress, spring members 26 and 27 act to force heel portion 21 and compressible cellular plastic material 22 onto fillpipe 35, thus providing an improved seal between fillpipe 35 and compressible cellular plastic material 22 attached to heel portion 21. Fasteners 28, e.g., strips of tape, may be used at the points of intersection of spring members 26 and 27 to hold the spring members together at these points.

Figure 3:
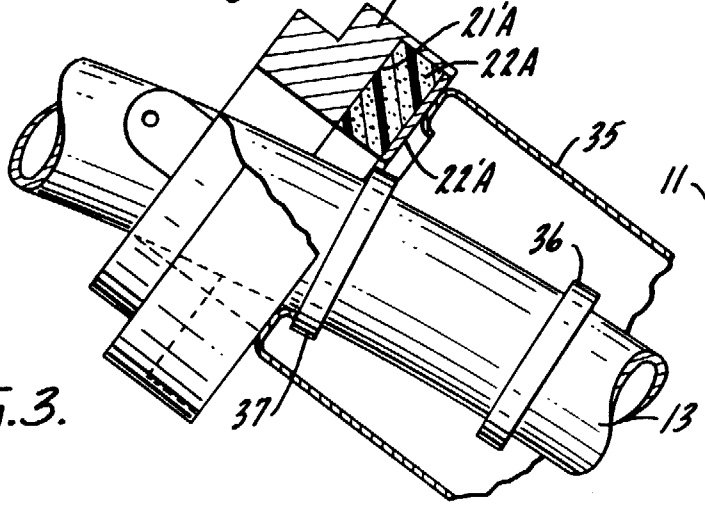
FIG. 3 is an enlarged view, partly in section, of an additional embodiment of the improved liquid-dispensing nozzle assembly of the present invention inserted into a fillpipe of an automobile fuel tank.

FIG. 3 also shows an alternate embodiment of the present apparatus. Instead of having a substantially flat face as in the embodiment shown in FIG. 1, heel portion 21A has a cupped surface 21'A. Compressible cellular plastic material 22A is attached, e.g., adhesively bound, to the inside of cupped surface 21'A and includes protective coating 22'A which is adhesively bound to material 22A. In this embodiment, heel portion 21A provides improved protection for material 22A with a resulting increase in service life.

Figure 2:
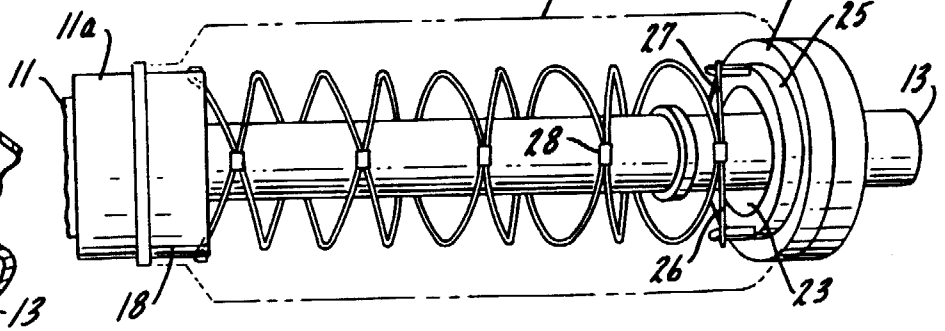
FIG. 2 is a partial top view of the improved liquid-dispensing nozzle assembly of the present invention shown in FIG. 1.

[It is essential to] *The embodiment of* the present invention [that] *illustrated in FIG. 2 includes* more than one, preferably two, spring members, e.g., such as spring members 26 and 27, acting to extend bellows 17 be attached to different points, preferably substantially opposing points, of the face means. By attaching more than one such spring members to different points of the face means of the present apparatus, the face means is provided with substantially free rotational movement transverse to the axis of spout 13.

Spring members 26 and 27 may be constructed of any suitable material or materials of construction. In many instances, metal and metal alloys such as aluminum, iron, carbon steel, or stainless steel, copper and the like may be used to construct these spring members. Of course, these spring members should be made of materials which are substantially unaffected by the liquid being dispensed and the conditions, e.g., temperature, pressure, and the like, at which the present apparatus is normally operated. In addition, the materials of construction should have no substantial detrimental effect on the liquid being dispensed.

The particular configuration of these spring members is not critical to the present invention. For example, the springs may have substantially the same or different sized spirals, and may have any suitable cross-section, e.g., square, circular and the like. In one preferred embodiment, at least one of the spring members is reverse wound. The spring members should have sufficient strength so that they act to extend the flexible vapor collector and provide an improved seal between the face means of the present apparatus and the receiver inlet. Preferably, each of these spring members exerts a force in the range from about 2 foot-pounds to about 25 foot-pounds, more preferably from about 3 foot-pounds to about 13 foot-pounds.

As seen in FIG. 3, coating 22'A of compressible cellular plastic material 22A comes into contact with the fillpipe 35. More specifically, referring to FIG. 3, spout 13 is shown inserted into a fillpipe 35, the upper portion of the latter contacting coating 22'A of compressible cellular plastic material 22A thereby forming a seal against vapor escape. The spout 13 is shown as being provided with two latching means 36 and 37 which assist in maintaining the spout 13 in the fillpipe 35 during the filling operation. Latching means 36 and 37 are attached, e.g., bolted, to spout 13. In operation, as the spout 13 is inserted into the fillpipe 35, latch means 37 (or 36) acts to retain the spout 13 in fillpipe 35. As the spout 13 is inserted into the fillpipe 35, bellows 17 tends to become compressed and the spout 13 is retained in fillpipe 35 by latch means 37 (or 36), compressible cellular plastic material 22A tightly seals the fillpipe 35 against possible vapor loss. Vapors which leave fillpipe 35 pass through space 23 into the interior of bellows 17 from which they are removed through aperture 20 (see FIG. 1).

Compressible cellular plastic material 22 may be secured to the heel portion 21 of bellows 17 by any suitable means, for example, an epoxy-type cement can be employed for this purpose, but those skilled in the art will realize thay any suitable adhesive means may be employed for this purpose. In the embodiment shown in FIG. 1, heel portion 21, compressible cellular plastic material 22 and coating 22' together make up the face means of the present apparatus. Of course, the flexible bellows 17 and compressible cellular plastic material 22 are formed of materials which are substantially resistant to the fuel liquid and vapor being processed. For example, the bellows may be comprised of a flexible polychloroprene rubber, such bellows being commercially available.

The compressible cellular plastic material 22 is defined as a cellular plastic material which is compressible under a normal load (in psi.) obtained when the compressible cellular plastic material 22 contacts the fillpipe 35 during the dispensing of fuel. The term "compressible" is used in its normal dictionary sense and includes materials which deform to a certain extent when the spout 13 of the nozzle 10 is inserted into the fillpipe 35, thereby providing an extremely good seal against vapor escape. Typically, the compressible cellular plastic material 22 is compressed under such normal load in the range of from about 5 to about 85%, more preferably from about 25 to about 70%, based upon the original volume of material. Examples of the compressible cellular plastic material 22 include the cellular material (i.e., foams) obtained from polychloroprene latex, polyolefin, e.g., polyethylene, polypropylene, mixtures thereof and the like, polyethylene, silicone, urethane polymer, polyvinyl chloride, polytetrafluoroethylene, cellulose acetopropionate, and urea-formaldehyde resin. Particularly preferred compressible cellular plastic materials 22 are polyurethane foam and polychloroprene latex foam. As stated above, such compressible cellular plastic material 22 should be substantially resistant towards the fuel liquid being dispensed and the corresponding vapor, particularly when such fuel is gasoline.

As noted above, the exposed surface of the compressible cellular plastic material 22 can be coated with coating 22' of the same plastic material used to form the cellular plastic material 22. Thus, the exposed surface of material 22 can have a coating which contacts the receiver inlet, e.g., fillpipe 35, to which liquid is being dispensed. In addition, the exposed face of the compressible cellular plastic material 22 can have a coating 22' which is of a different material, such as a synthetic resinuous material or a natural occurring material, both of which are substantially resistant to the liquid fuel being dispensed and the vapor being collected. The coating 22', either the same or different from the compressible cellular plastic material 22, has to be resilient, that is, the material deforms to a certain extent when the spout 13 of nozzle 10 is inserted into fillpipe 35. Typical examples of resilient material are leather and synthetic resins, such as listed previously, in particular polychloroprene (neoprene). It is contemplated within the scope of this invention that the term "compressible cellular plastic material" includes such protective coating of resilient material attached to the exposed surface of compressible cellular plastic material.

The thickness of the compressible cellular plastic material is not critical and may vary from a minimum thickness required to provide an effective nozzle assembly-receiver inlet seal to maximum thickness which is dictated by economic considerations, i.e., an extremely thick material would not be required. Preferably, the thickness of the compressible cellular plastic material 22 ranges from about 1/16 inch to about ½ inch.

The following examples illustrate more clearly the apparatus and method of the present invention. However, these illustrations are not to be interpreted as specific limitations on this invention.

EXAMPLE I

A commercially available vapor recovering, gasoline dispensing nozzle was equipped with a bellows made of a synthetic plastic material as a vapor recovery means, one end of which was attached to the nozzle housing, the other end of the vapor recovery means surrounded the nozzle outlet (or spout) and had a concave teflon insert therein. This nozzle also included a face means having a surface means approximately ¼ inch in thickness which came in contact with the fillpipe to provide a seal during gasoline dispensing. A shell member, attached to the surface means, contacted the concave teflon insert of the bellows to provide a rotationally (transverse to the axis of the spout) adjustable vapor tight seal between the face means and the bellows. The nozzle was also equipped with a latch means which acted to maintain the nozzle in the fillpipe after insertion.

Included within the bellows was one right hand wound spring member which acted to extend the bellows and, therefore, force the face means onto the fillpipe during gasoline dispensing. This spring means was attached neither to the end of the bellows away from the housing nor to the surface means or shell member.

Gasoline was dispensed into a total of 143 vehicles using the nozzle described above. The fuel tank fillpipes on many of these vehicles were located in various differing positions. Once the nozzle had been inserted and latched into the fillpipe, fueling proceeded without hand holding the nozzle to the fillpipe. Using conventional hydrocarbon monitoring equipment, the amount and percentage of hydrocarbon recovered from each fuel tank was determined. The following table lists the average percentage hydrocarbon recovery utilizing the above-described nozzle.

TABLE I

| Type of Nozzle | No of Vehicles Fueled | Average Percent Hydrocarbon Recovery |
|---|---|---|
| Example I | 143 | 81.7 |

EXAMPLE II

A vapor recovery gasoline dispensing nozzle according to the present invention was constructed. This nozzle was similar to the nozzle depicted in FIGS. 1 and 2. Unlike the apparatus of Example I, each of the two spring members in the bellows was attached to different, essentially opposing, points of the heel portion of the face means to provide the face means with substantially free rotational movement transverse to the axis of the outlet spout. Since both spring members were attached to the heel portion of the face means, the face means of this nozzle had significantly more rotational freedom than was apparent in the apparatus of Example I. This increased freedom of motion allowed the nozzle of the present invention to effect a vapor tight seal with fillpipes of substantially more vehicles than the apparatus of Example I. A closed cell synthetic polymer foam of approximately ¼ inch thickness which had a thin coating of a synthetic polymer was adhesively bound to the heel portion of the face means to come in contact and provide a seal with the fillpipe.

Once this apparatus was inserted and latched into the fillpipe, fueling proceeded without hand holding. As before, the fuel tank fillpipes on many of the vehicles fueled using this nozzle assembly were located in various differing positions. The following table lists the average percentage hydrocarbon recovered from the vehicles fuel tanks while fueling using this apparatus.

TABLE II

| Type of Nozzle | No. of Vehicles Fueled | Average Percent Hydrocarbon Recovery |
|---|---|---|
| Present Apparatus | 131 | 91.3 |

These examples clearly illustrate the outstandingly improved results obtained with the present apparatus. For example, the plurality of spring members attached to different points of the face means and acting to extend the vapor recovery means and face means onto the fillpipe are unexpectedly more effective than the unattached spring means of the apparatus of Example I. In addition, since the face means of the present apparatus is an integral part of the present apparatus, being attached to the plurality of spring members, the position of the face means can be adjusted substantially more radically than is the case with the face means of the Example I nozzle. This feature allows the present apparatus to be compatible, e.g., effect a vapor tight nozzle-fillpipe seal, in substantially more instances, e.g., with fillpipes having significantly differing positions, than it possible with the other nozzles, e.g., the nozzle of Example I.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A liquid-dispensing nozzle assembly for delivery of liquid from a liquid source to a liquid receiver having a receiver inlet, said assembly being provided with means to reduce escape of vapor during delivery of liquid to said receiver inlet from said source, said nozzle assembly comprising:

a liquid dispensing nozzle having a nozzle inlet, a nozzle housing and an elongated discharge spout adapted for insertion into said receiver inlet;

a flexible vapor collector surrounding, in spaced relation thereto and forming a chamber therearound, the upper portion of said spout nearest said nozzle housing, said chamber being in fluid communication with said receiver inlet during said liquid delivery, one end of said vapor collector being attached to said nozzle housing;

a face means located adjacent to and carried by the second end of said vapor collector away from said end attached to said housing for forming a surface seal against the outer surface of said receiver inlet, provided that said spout extends beyond said second end of said vapor collector during said liquid dispensing; and at least two spring members located in spaced relation therearound said spout and acting to extend said vapor collector means, each of said spring members having one end attached to a different point of said face means so that said face means has substantially free rotational movement transverse to the axis of said spout.

2. In a method for dispensing liquid from a liquid source to a liquid receiver having a receiver inlet using a liquid dispensing nozzle assembly, the improvement which comprises dispensing said liquid using the nozzle assembly of claim 1.

3. The apparatus of claim 1 wherein each said spring member exerts a force in the range of about 2 foot-pounds to about 25 foot-pounds.

4. In a method for dispensing liquid hydrocarbon fuel from a liquid hydrocarbon fuel source to a liquid hydrocarbon fuel receiver having a receiver inlet using a liquid hydrocarbon fuel dispensing nozzle assembly, the improvement which comprises dispensing said liquid hydrocarbon fuel using the nozzle assembly of claim 3.

5. The liquid dispensing nozzle assembly of claim 1 wherein said spring members number two and one end of each of said spring members is attached to essentially opposing points of said face means.

6. In a method for dispensing liquid hydrocarbon fuel from a liquid hydrocarbon fuel source to a liquid hydrocarbon fuel receiver having a receiver inlet using a liquid hydrocarbon fuel dispensing nozzle assembly, the improvement which comprises dispensing said liquid hydrocarbon fuel using the nozzle assembly of claim 5.

7. The liquid dispensing nozzle assembly of claim 5 wherein said flexible vapor collector comprises a flexible bellows.

8. The apparatus of claim 1 wherein said spring members are located at least partially inside the outer surface of said vapor collector.

9. The apparatus of claim 8 wherein said face means comprises a heel portion to different points on which one end of each of said spring members is attached and a compressible cellular plastic material attached to said heel portion, said material coming in contact with said liquid receiver inlet during said liquid dispensing.

10. The apparatus of claim 9 wherein said heel portion has a cupped surface and said compressible cellular plastic material is attached to the inside of said cupped surface.

11. In a method for dispensing liquid from a liquid source to a liquid receiver having a receiver inlet using a liquid dispensing nozzle assembly, the improvement which comprises dispensing said liquid using the nozzle assembly of claim 9.

12. The apparatus of claim 8 which further comprises at least one latch means located adjacent to said spout for automatically maintaining said spout in said liquid receiver inlet after insertion.

13. In a method for automatically dispensing liquid from a liquid source to a liquid receiver having a receiver inlet using a liquid dispensing nozzle assembly, the improvement which comprises dispensing said liquid using the nozzle assembly of claim 12.

14. The apparatus of claim 12 wherein said face means comprises a heel portion to different points on which one end of each of said spring members is attached and a compressible cellular plastic material attached to said heel portion, said material coming in contact with said liquid receiver inlet during said liquid dispensing.

15. In a method for automatically dispensing liquid from a liquid source to liquid receiver having a receiver inlet using a liquid dispensing nozzle assembly, the improvement which comprises dispensing said liquid using the nozzle assembly of claim 14.

16. The liquid dispensing nozzle assembly of claim 14 wherein said spring members number two and one end of each of said spring members is attached to essentially opposing points of said face means.

17. In a method for automatically dispensing liquid hydrocarbon fuel from a liquid hydrocarbon fuel source to a liquid hydrocarbon fuel receiver having a receiver inlet using a liquid hydrocarbon fuel dispensing nozzle assembly, the improvement which comprises dispensing said liquid hydrocarbon fuel using the nozzle assembly of claim 16.

18. The liquid dispensing nozzle assembly of claim 16 wherein sid flexible vapor collector comprises a flexible bellows.

19. A liquid dispensing nozzle assembly of claim 18 wherein said compressible cellular plastic material comprises a polymer selected from the group consisting of polyolefin, polychloroprene latex, silicone, urethane polymer, polyvinyl chloride, polytetrafluoroethylene, cellulose acetopropionate, and urea-formaldehyde resin.

20. The apparatus of claim 14 wherein said heel portion has a cupped surface and said compressible cellular plastic material is attached to the inside of said cupped surface.

21. The liquid dispensing nozzle assembly of claim 20 wherein said spring members number two and one end of each of said spring members is attached to essentially opposing points of said face means.

22. The liquid dispensing nozzle assembly of claim 21 wherein said flexible vapor collector comprises a flexible bellows.

23. A liquid dispensing nozzle assembly of claim 22 wherein said compressible cellular plastic material comprises a polymer selected from the group consisting of polyolefin, polychloroprene latex, silicone, urethane polymer, polyvinyl chloride, polytetrafluoroethylene, cellulose acetopropionate, and urea-formaldehyde resin.

24. The apparatus of claim 21 wherein each said spring member exerts a force in the range from about 2 foot-pounds to about 25 foot-pounds.

25. In a method for automatically dispensing liquid from a liquid source to a liquid receiver having a receiver inlet using a liquid dispensing nozzle assembly, the improvement which comprises dispensing said liquid using the nozzle assembly of claim 24.

26. In a liquid-dispensing nozzle assembly for delivery of liquid from a liquid source to a liquid receiver having a receiver inlet, said assembly being provided with means to reduce escape of vapor during delivery of liquid to said receiver inlet from said source, which includes a liquid-dispensing nozzle having a nozzle inlet, a nozzle housing and an elongated discharge spout adapted for insertion into said receiver inlet; a vapor collector surrounding, in spaced relation thereto and forming a chamber therearound, the upper portion of said spout nearest said nozzle housing, said chamber being in fluid communication with said receiver inlet during said liquid delivery, one end of said vapor collector being attached to said nozzle housing or said upper portion of the spout; a face means located adjacent to the second end of said vapor collector for forming a surface seal against the outer surface of said receiver inlet, provided that said spout extends beyond said second end of said vapor collector during said liquid dispensing; and spring means interposed within said vapor collector and acting to extend said vapor collector, the improvement which comprises said spring means being attached to a plurality of different points on said face means, said spring means and said vapor collector cooperating with said face means to provide for substantially free rotational movement of said face means transverse to the axis of said spout prior to insertion of said spout into said receiver inlet.

27. The apparatus of claim 26 wherein said face means comprises a heel portion to different points on which said spring means is attached and a resilient material attached to said heel portion, said material coming in contact with said liquid receiver inlet during said liquid dispensing.

28. The apparatus of claim 27 wherein said resilient material comprises at least one compressible cellular plastic material.

29. The apparatus of claim 28 wherein said spring means is attached to two essentially opposing points on said heel portion.

30. The apparatus of claim 29 wherein said heel portion has a cupped surface and said compressible cellular plastic material is attached to the inside of said cupped surface.

31. A liquid dispensing nozzle assembly of claim 30 wherein said compressible cellular plastic material is obtained from a polymer selected from the group consisting of polychloroprene latex, silicone, urethane polymer, poly (vinyl chloride) and polytetrafluoroethylene and the liquid is a fuel.

32. A liquid dispensing nozzle assembly of claim 31 wherein said compressible cellular plastic material is obtained from a polymer selected from the group consisting of polychloroprene latex, and polytetrafluoroethylene.

33. A liquid dispensing nozzle assembly of claim 31 wherein the exposed face of the compressible cellular plastic material comprises an additional resilient material.

34. The apparatus of claim 28 wherein said heel portion has a cupped surface and said compressible cellular plastic material is attached to the inside of said cupped surface.

35. A liquid dispensing nozzle assembly of claim 34 wherein said compressible cellular plastic material is obtained from a polymer selected from the group consisting of polychloroprene latex, silicone, urethane polymer, poly (vinyl chloride) and polytetrafluoroethylene and the liquid is a fuel.

36. A liquid dispensing nozzle assembly of claim 35 wherein the exposed face of the compressible cellular plastic material comprises an additional resilient material.

37. A liquid dispensing nozzle assembly of claim 36 wherein said additional resilient material is selected from the group consisting of leather and a synthetic resinous material.

38. A liquid dispensing nozzle assembly of claim 37 wherein said additional resilient material is selected from leather and polychloroprene.

39. The apparatus of claim 38 wherein said vapor collector comprises a flexible bellows.

40. The apparatus of claim 39 which further comprises at least one latch means located adjacent to said spout for automatically maintaining said spout in said liquid receiver inlet after insertion and wherein said spring means exerts a force in the range from about 2 ft./lb. to about 25 ft./lb.

41. The apparatus of claim 28 wherein said vapor collector comprises a flexible bellows.

42. The apparatus of claim 41 which further comprises at least one latch means located adjacent to said spout for automatically maintaining said spout in said liquid receiver inlet after insertion and wherein said spring means exerts a force in the range from about 2 ft./lb. to about 25 ft./lb.

* * * * *